(12) United States Patent
Jung et al.

(10) Patent No.: US 12,294,549 B2
(45) Date of Patent: May 6, 2025

(54) METHOD AND APPARATUS FOR TRANSMITTING HARQ-ACK INFORMATION

(71) Applicant: Lenovo (Singapore) Pte. Ltd., New Tech Park (SG)

(72) Inventors: Hyejung Jung, Northbrook, IL (US); Vijay Nangia, Woodridge, IL (US); Hossein Bagheri, Urbana, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 77 days.

(21) Appl. No.: 17/700,349

(22) Filed: Mar. 21, 2022

(65) Prior Publication Data
US 2022/0209925 A1 Jun. 30, 2022

Related U.S. Application Data

(63) Continuation of application No. 16/672,497, filed on Nov. 3, 2019, now Pat. No. 11,296,849.
(Continued)

(51) Int. Cl.
*H04L 5/00* (2006.01)
*H04W 72/04* (2023.01)
(Continued)

(52) U.S. Cl.
CPC .......... *H04L 5/0055* (2013.01); *H04L 5/0007* (2013.01); *H04W 72/044* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 11,296,849 B2 | 4/2022 | Jung et al. | |
| 2019/0103947 A1* | 4/2019 | Park | H04L 1/1861 |

(Continued)

FOREIGN PATENT DOCUMENTS

| | | |
|---|---|---|
| CN | 113302863 A | 8/2021 |
| CN | 113302863 B | 5/2024 |

(Continued)

OTHER PUBLICATIONS

Jung, Hyejung , et al., "Pursuant to MPEP § 2001.06(b) the applicant brings the following application to the Examiner's attention:", U.S. Appl. No. 62/755,407, Nov. 2, 2018, 27 pages.

*Primary Examiner* — Steve R Young
(74) *Attorney, Agent, or Firm* — FIG. 1 Patents

(57) ABSTRACT

A configuration of a set of subslots within a slot can be received, each of one or more subslots of the set of subslots can have a time interval within the slot. An indication of a first PUCCH resource for transmitting HARQ-ACK information during the slot can be received, the first PUCCH resource overlapping in time with at least one uplink channel resource scheduled for transmission during the slot, the indication indicating that transmission of the HARQ-ACK information ends within a subslot of the set of subslots, and a last symbol of the first PUCCH resource being within the subslot. The HARQ-ACK information can be multiplexed on a second PUCCH resource, the second PUCCH resource being in the subslot of the set of subslots within the slot.

20 Claims, 4 Drawing Sheets

Related U.S. Application Data

(60) Provisional application No. 62/755,407, filed on Nov. 2, 2018.

(51) Int. Cl.
*H04W 72/044* (2023.01)
*H04W 72/23* (2023.01)

(56) References Cited

U.S. PATENT DOCUMENTS

| | | | |
|---|---|---|---|
| 2019/0223205 A1* | 7/2019 | Papasakellariou | H04L 5/0057 |
| 2019/0306922 A1* | 10/2019 | Xiong | H04W 72/21 |
| 2019/0349917 A1* | 11/2019 | Huang | H04W 72/21 |
| 2020/0106564 A1* | 4/2020 | Rungta | H04L 5/0057 |
| 2020/0145144 A1* | 5/2020 | Hosseini | H04W 72/0446 |
| 2020/0145167 A1 | 5/2020 | Jung et al. | |
| 2021/0211241 A1* | 7/2021 | Xiong | H04L 5/0044 |
| 2021/0391955 A1* | 12/2021 | He | H04L 5/0053 |
| 2022/0007356 A1* | 1/2022 | Lee | H04L 27/26 |
| 2025/0088336 A1 | 3/2025 | Jung et al. | |

FOREIGN PATENT DOCUMENTS

| | | |
|---|---|---|
| CN | 118382144 A | 7/2024 |
| EP | 3874643 A1 | 9/2021 |
| WO | 2020089875 A1 | 5/2020 |

* cited by examiner

METHOD AND APPARATUS FOR TRANSMITTING HARQ-ACK INFORMATION

BACKGROUND

1. Field

The present disclosure is directed to a method and apparatus for transmitting Hybrid Automatic Repeat Request-Acknowledgement (HARQ-ACK) information. More particularly, the present disclosure is directed to transmitting HARQ-ACK information based on a Physical Uplink Control Channel (PUCCH) resource.

2. Introduction

Presently, wireless communication devices, such as User Equipment (UE), communicate with other communication devices using wireless signals. In Third Generation Partnership Project (3GPP) Release 15 New Radio (NR), a basic support for Ultra-Reliable and Low-Latency Communication (URLLC) was introduced with Transmission Time Interval (TTI) structures for low latency as well as methods for improved reliability. For example, non-slot, such as a mini-slot having 2, 4, or 7 symbols and a duration shorter than a slot duration of 14 symbols, based scheduling and transmission of Physical Downlink Shared Channel (PDSCH)/Physical Uplink Shared Channel (PUSCH) are allowed, and PDSCH/PUSCH slot aggregation is supported. PDSCH/PUSCH slot aggregation includes repetition of PDSCH/PUSCH over multiple slots. Further use cases with tighter latency and reliability requirements include release 15 enabled use case improvements, such as Augmented Reality (AR) and Virtual Reality (VR) use cases. Further use cases with tighter latency and reliability requirements also include new release 16 use cases with higher requirements, such as factory automation use cases, transport industry use cases, and electrical power distribution use cases.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for communicating on a wireless network. At least some embodiments can provide a method and apparatus for HARQ-ACK feedback in URLLC. At least some embodiments can provide a UE with multiple HARQ-ACK feedback opportunities in a slot. At least some embodiments can also provide for multiplexing multiple Uplink Control Information (UCI) including low latency HARQ-ACK feedback on PUCCH or PUSCH. At least some embodiments can also provide for determining one or more non-overlapping PUCCH(s) in a slot for transmitting multiplexed UCI, with some possible UCI dropping, while satisfying low-latency HARQ-ACK feedback requirements, if a UE transmits multiple PUCCHs in the slot and also performs multiple HARQ-ACK transmissions for low-latency HARQ-ACK feedback in the slot. At least some embodiments can also provide for determining one or more PUCCH resources for low-latency HARQ-ACK feedback in the slot if multiple PDCCHs carrying Downlink (DL) Downlink Control Information (DCI) indicate HARQ-ACK feedback in the same slot. At least some embodiments can provide for selecting a second PUCCH resource that ends no later than a time instance in a slot.

According to a possible embodiment, a first PUCCH resource assigned for HARQ-ACK information in a slot where one or more PUCCHs are scheduled to be transmitted can be determined. A time instance in the slot can be determined. A group of PUCCH resources can be determined among the one or more PUCCH resources that end no later than the time instance. A second PUCCH resource for transmitting the HARQ-ACK information can be determined from the group of PUCCH resources. The HARQ-ACK information based on the second PUCCH resource can be transmitted.

Figure 1:
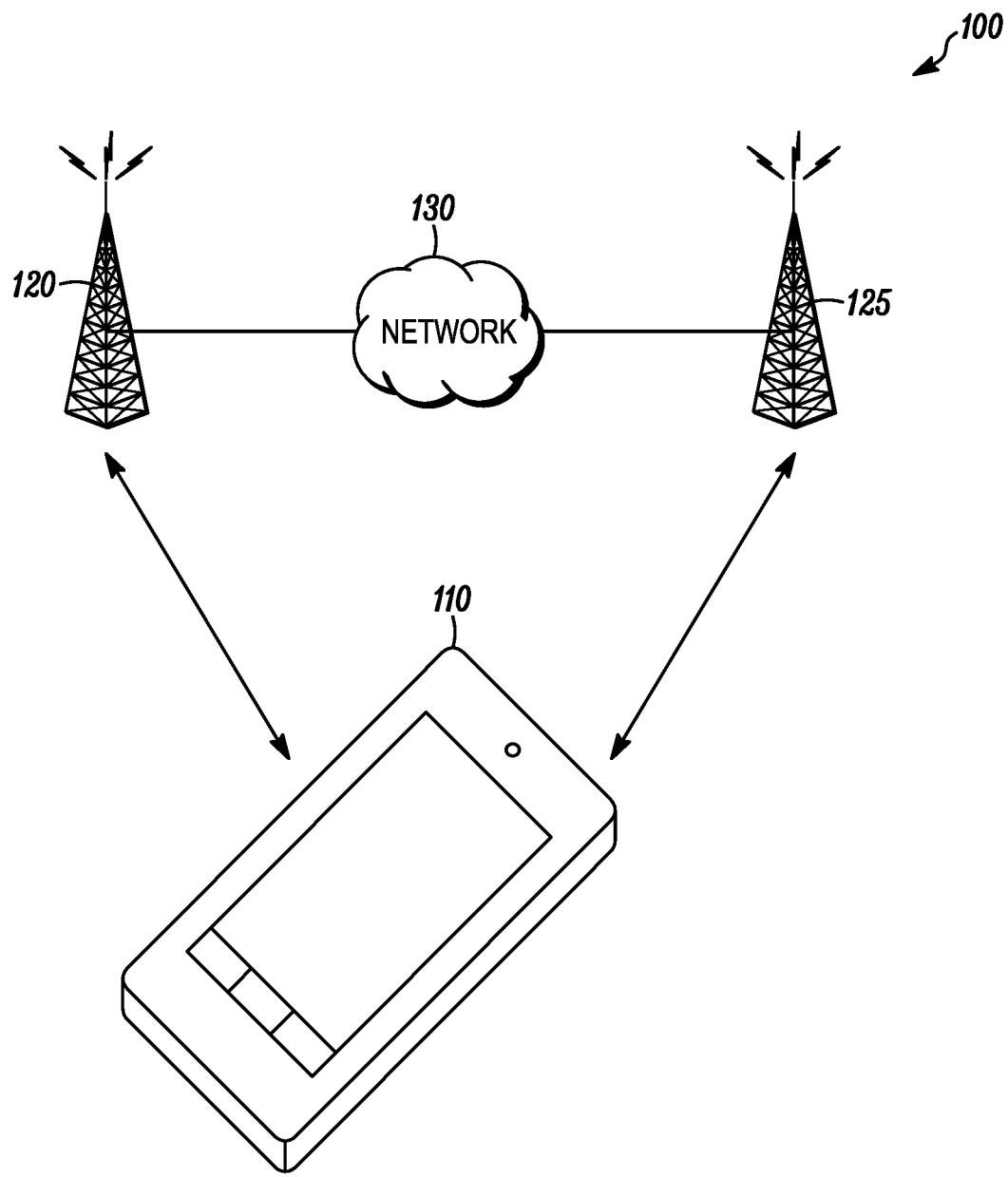
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an Internet of Things (IoT) device, or any other user device that is capable of sending and receiving communication signals on a wireless network. The at least one network entity 120 and 125 can be a wireless wide area network base station, can be a NodeB, can be an enhanced NodeB (eNB), can be a NR NodeB (gNB), such as a Fifth Generation (5G) NodeB, can be an unlicensed network base station, can be an access point, can be a base station controller, can be a network controller, can be a Transmission/Reception Point (TRP), can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3GPP-based network, a 5G network, a satellite communications network, a high altitude platform network, the Internet, and/or other communications networks.

In operation, the UE 110 can communicate with the network 130 via at least one network entity 120. For example, the UE 110 can send and receive control signals on a control channel and user data signals on a data channel.

One potential physical layer enhancement for URLLC can be to support more than one PUCCH transmissions from a UE for HARQ-ACK feedback within a slot. Non-slot based scheduling and multiple HARQ-ACK feedback opportunities within a slot can reduce HARQ-ACK Round Trip Time (RTT) for URLLC.

In 3GPP Release-15 NR, a UE may not expect to transmit more than one PUCCH with HARQ-ACK information in a slot and accordingly, potential delay for HARQ-ACK transmission may be expected. For example, if the UE detects a first DL DCI, such as DCI format 1_0 or DCI format 1_1, indicating a first resource for a PUCCH transmission with corresponding HARQ-ACK information in a slot and also detects at a later time a second DL DCI indicating a second resource for a PUCCH transmission with corresponding HARQ-ACK information in the slot, the UE may not expect to multiplex HARQ-ACK information corresponding to the second DCI format in a PUCCH resource in the slot if the PDCCH reception that includes the second DCI format is not earlier than $N_3$ symbols from a first symbol of the first resource for PUCCH transmission in the slot. For UE processing capability 1, $N_3=8$ for 15 KHz Subcarrier Spacing (SCS), $N_3=10$ for 30 KHz SCS, $N_3=7$ for 60 KHz SCS, and $N_3=20$ for 120 KHz SCS.

If multiple PDCCHs carrying DL DCI, such as PDSCH assignments, indicate the same slot for HARQ-ACK feedback, the UE can first determine HARQ-ACK information to be multiplexed in a PUCCH resource in the slot according to the timing condition described above, can determine a PUCCH resource set based on the number of HARQ-ACK information bits to be multiplexed, and can determine the PUCCH resource for HARQ-ACK feedback from the PUCCH resource set based on a PUCCH resource indicator field in a last DL DCI format, such as DCI format 1_0 or DCI format 1_1, among the detected DL DCI formats that have a value of a PDSCH-to-HARQ feedback timing indicator field indicating the same slot for the PUCCH transmission. For PUCCH resource determination, the detected DCI formats can be first indexed in an ascending order across serving cells indexes and then can be indexed in an ascending order across PDCCH monitoring occasion indexes.

Furthermore, in Release-15 NR, the UE can transmit only two short PUCCHs, such as PUCCH format 0 or format 2, or one short PUCCH and one long PUCCH, such as PUCCH format 1, format 3, or format 4, within a slot. If the UE needs to transmit multiple overlapping PUCCHs in a slot or overlapping PUCCH(s) and PUSCH(s) in a slot, such as overlapping in time, if the UE is configured to multiplex different UCI types in one PUCCH, and if at least one of the multiple overlapping PUCCHs or PUSCHs is in response to a DCI format detection by the UE, then the UE can multiplex all corresponding UCI types if the timeline conditions described in Subclause 9.2.5 of 3GPP TS 38.213 are met. The UE may not expect a PUCCH or a PUSCH that is in response to a DCI format detection to overlap with any other PUCCH or PUSCH that does not satisfy the timing conditions in Subclause 9.2.5 of 3GPP TS 38.213.

In order to support multiple HARQ-ACK feedback opportunities within a slot from a UE, HARQ-ACK information can always be transmitted in an indicated PUCCH resource. If detecting multiple DL DCI formats indicating a same PUCCH resource for HARQ-ACK feedback, a UE can multiplex corresponding HARQ-ACK information and can transmit it in the same PUCCH resource. Further, separate PUCCH resource configurations and/or separate HARQ-ACK codebooks for enhanced Mobile Broadband (eMBB) and URLLC can be used. For UCI multiplexing in PUSCH, HARQ-ACK feedback for URLLC may not be multiplexed in eMBB PUSCH but can be multiplexed in URLLC PUSCH, where a HARQ-ACK feedback type, such as URLLC vs eMBB, and/or a PUSCH type, such as eMBB vs URLLC, can be explicitly indicated via corresponding DCI or can be implicitly determined based on a PUSCH duration, a PUCCH resource, a PDCCH search space, and/or other criteria.

While transmitting HARQ-ACK information only in the indicated PUCCH resource can accommodate multiple PUCCH transmissions carrying HARQ-ACK information in a slot, a network entity can be allowed to re-assign a different PUCCH resource for additional multiplexing and/or collision avoidance.

At least embodiments can provide an enhanced UE procedure for reporting HARQ-ACK with low latency. According to 3GPP TS 38.213, if a UE detects a DCI format 1_0 or a DCI format 1_1 scheduling a PDSCH reception ending in slot n or if the UE detects a DCI format 1_0 indicating a Semi-Persistent Scheduling (SPS) PDSCH release through a PDCCH reception ending in slot n, the UE can provide corresponding HARQ-ACK information in a PUCCH transmission within slot n+k, where k can be a number of slots and can be indicated by a PDSCH-to-HARQ-timing-indicator field in the DCI format, if present, or provided by higher layer parameter dl-DataToUL-ACK. For DCI format 1_0, the PDSCH-to-HARQ-timing-indicator field values can map to $\{1, 2, 3, 4, 5, 6, 7, 8\}$. For DCI format 1_1, if present, the PDSCH-to-HARQ-timing-indicator field values can map to values for a set of number of slots provided by higher layer parameter dl-DataToUL-ACK. If the UE detects a DCI format 1_1 that does not include a PDSCH-to-HARQ-timing-indicator field and schedules a PDSCH reception or activates a SPS PDSCH reception ending in slot n, the UE can provide corresponding HARQ-ACK information in a PUCCH transmission within slot n+k where k can be provided by higher layer parameter dl-DataToUL-ACK.

In DCI formats 1_0 and 1_1, the PUCCH resource indicator field values can map to values of a set of PUCCH resource indices provided by higher layer parameter ResourceList for PUCCH resources from a set of PUCCH resources provided by higher layer parameter PUCCH-ResourceSet with a maximum of eight PUCCH resources. For the set of PUCCH resources and when the size $R_{PUCCH}$ of higher layer parameter ResourceList is larger than eight, when a UE provides HARQ-ACK information in a PUCCH transmission in response to detecting a last DCI format 1_0 or DCI format 1_1 in a PDCCH reception, among DCI formats 1_0 or DCI formats 1_1 with a value of the PDSCH-to-HARQ feedback timing indicator field indicating a same slot for the PUCCH transmission, the UE can determine a PUCCH resource with index $r_{PUCCH}$, $0 \leq r_{PUCCH} \leq R_{PUCCH}-1$, as $$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

where $N_{CCE,p}$ is a number of CCEs in control resource set p of the PDCCH reception for the DCI format 1_0 or DCI format 1_1, $n_{CCE,p}$ is the index of a first CCE for the PDCCH reception, and $\Delta_{PRI}$ is a value of the PUCCH resource indicator field in the DCI format 1_0 or DCI format 1_1.

According to a possible embodiment, a UE can receive an indication of a maximum number of HARQ-ACK transmission opportunities in a slot and/or can receive a configuration for one or more time intervals within the slot for multiple HARQ-ACK transmissions in the slot. For example, each of one or more time intervals within a slot can be defined as a subslot, where a slot can include at least one subslot. In an example, the can UE receive an indication of a set of symbols within a slot and can determine one or more configured time intervals within the slot based on the indicated set of symbols. The indicated set of symbols within the slot can be starting or ending symbols of the one or more configured time intervals within the slot and the UE can perform at most one HARQ-ACK transmission for each of the one or more configured time intervals. In one example, the UE can be semi-statically configured with the maximum number of HARQ-ACK transmission opportunities within a slot and/or configured with a configuration for one or more time intervals within the slot. In another example, the UE can be semi-statically configured with a set of values for the maximum number of HARQ-ACK transmission opportunities in a slot and/or a set of corresponding configurations for one or more time intervals within the slot and can be dynamically indicated for a selected value for the maximum number of HARQ-ACK transmission opportunities and/or a selected configuration for one or more time intervals within a slot. For example, dynamic indication can be via group-common PDCCH intended to a group of UEs in a cell or UE-specific PDCCH intended to the UE.

According to another possible embodiment, a UE can receive an indication indicating whether an uplink channel, such as PUSCH or PUCCH, carrying HARQ-ACK information should end within a time interval in a slot or not. The last symbol of a PUCCH resource assigned for the HARQ-ACK information can be located within the time interval and the uplink channel carrying the HARQ-ACK information may or may not be the same as the assigned PUCCH resource. The indication can be signaled as a higher-layer parameter or dynamically signaled in DCI. In one example, a PUCCH resource configuration Information Element (IE) 'PUCCH-Resource' can have a parameter 'forcedEnding', as shown in Table 1.

TABLE 1

Modified PUCCH-Resource Information Element

| PUCCH-Resource ::= | SEQUENCE { |
| pucch-ResourceId | PUCCH-ResourceId, |
| startingPRB | PRB-Id, |
| forcedEnding | ENUMERATED { enabled } |
| OPTIONAL, -- Need R | |
| intraSlotFrequencyHopping | ENUMERATED { enabled } |
| OPTIONAL, -- Need R | |
| secondHopPRB | PRB-Id |

TABLE 1-continued

Modified PUCCH-Resource Information Element

| OPTIONAL, -- Need R | |
| format | CHOICE { |
| format0 | PUCCH-format0, |
| format1 | PUCCH-format1, |
| format2 | PUCCH-format2, |
| format3 | PUCCH-format3, |
| format4 | PUCCH-format4 |
| } | |
| } | |

If the parameter 'forcedEnding' exists with the value 'enabled' in the 'PUCCH-Resource' of a first PUCCH resource, the UE can identify the first PUCCH resource as an assigned PUCCH resource for HARQ-ACK information, such as based on received DCI or higher-layer configuration, and if the UE transmits multiple PUCCHs and/or PUSCHs in the slot, then the UE can multiplex and transmit corresponding HARQ-ACK information and other UCI in a second PUCCH resource or PUSCH resource that ends within a time interval where the last symbol of the first PUCCH resource is located. In another example, a new or existing bit field and/or a PUCCH resource indicator field in DL DCI can indicate a PUCCH resource for HARQ-ACK information and that uplink transmission carrying the HARQ-ACK information can end within a time interval of a slot where the last symbol of the indicated PUCCH resource is located. The DL DCI can be a DCI carrying DL scheduling assignment.

According to a further possible embodiment, a UE can receive an indication that indicates whether an uplink channel, such as PUSCH or PUCCH, carrying HARQ-ACK information should end no later than the end of the last symbol of a PUCCH resource assigned for the HARQ-ACK information. Alternatively, the UE can receive an indication that indicates whether an uplink channel carrying HARQ-ACK information should end no later than a number of symbol durations after the end of the last symbol of a PUCCH resource assigned for the HARQ-ACK information. The number of symbol durations or the number of symbols can be predefined or indicated via higher layer signaling or DCI. In these embodiments, a timing threshold value no later than that which the uplink channel carrying the HARQ-ACK information should end can be determined based on the ending symbol of the PUCCH resource assigned for HARQ-ACK transmission.

The indication for forced ending of HARQ-ACK transmission, such as ending within one of configured time intervals determined by an assigned PUCCH resource or ending no later than a certain time determined by the assigned PUCCH resource, can guarantee bounded HARQ-ACK feedback delay even when the UE does not use the initially assigned PUCCH resource for HARQ-ACK transmission, but instead can multiplex multiple UCI including the HARQ-ACK information and transmits the multiplexed UCI in one PUCCH or PUSCH resource. The indication can be signaled as a higher-layer parameter, such as, as a part of PUCCH resource configuration, or via DCI, such as via a new or existing bit field and/or a PUCCH resource indicator, or any combination thereof. If the indication for forced ending of HARQ-ACK transmission is signaled in DCI, such as DCI carrying DL scheduling assignment, a given configured PUCCH resource can be used for both URLLC application and normal traffics depending on dynamic indication, which can provide for flexible resource utilization with less configuration overhead.

According to a further possible embodiment, if a UE receives an indication for forced ending of HARQ-ACK transmission, such as, as part of indication of an assigned PUCCH resource, a PUCCH resource configuration, an indication of URLLC operation mode, or any combination thereof, and the UE transmits multiple PUCCHs in a slot, then the UE can form a first group of PUCCH resources based on the multiple PUCCHs that can be transmitted in the slot; the UE can determine, based on a first assigned PUCCH resource for a first HARQ-ACK transmission, a first time instance no later than which the first HARQ-ACK transmission ends; the UE can form a second group of PUCCH resources by excluding a PUCCH resource(s) from the first group of PUCCH resources that overlaps with the first assigned PUCCH resource for HARQ-ACK and ends later than the first time instance; and the UE can determine at least one uplink channel, such as PUCCH or PUSCH, and its resource carrying multiplexed UCI including HARQ-ACK information based on the second group of PUCCH resources.

If there are multiple assigned PUCCH resources for multiple HARQ-ACK transmissions in the slot, the UE can perform timing tests iteratively for all HARQ-ACK transmissions with forced ending indication. That is, the UE can determine a second time instance, no later than which a second HARQ-ACK transmission ends, based on a second assigned PUCCH resource for the second HARQ-ACK transmission and can form a third group of PUCCH resources by excluding a PUCCH resource(s) from the second group of PUCCH resources that overlaps with the second assigned PUCCH resource for HARQ-ACK and ends later than the second time instance. Finally, one or more uplink channels and their resources carrying multiplexed UCI can be determined based on the third group of PUCCH resources.

Figure 2:
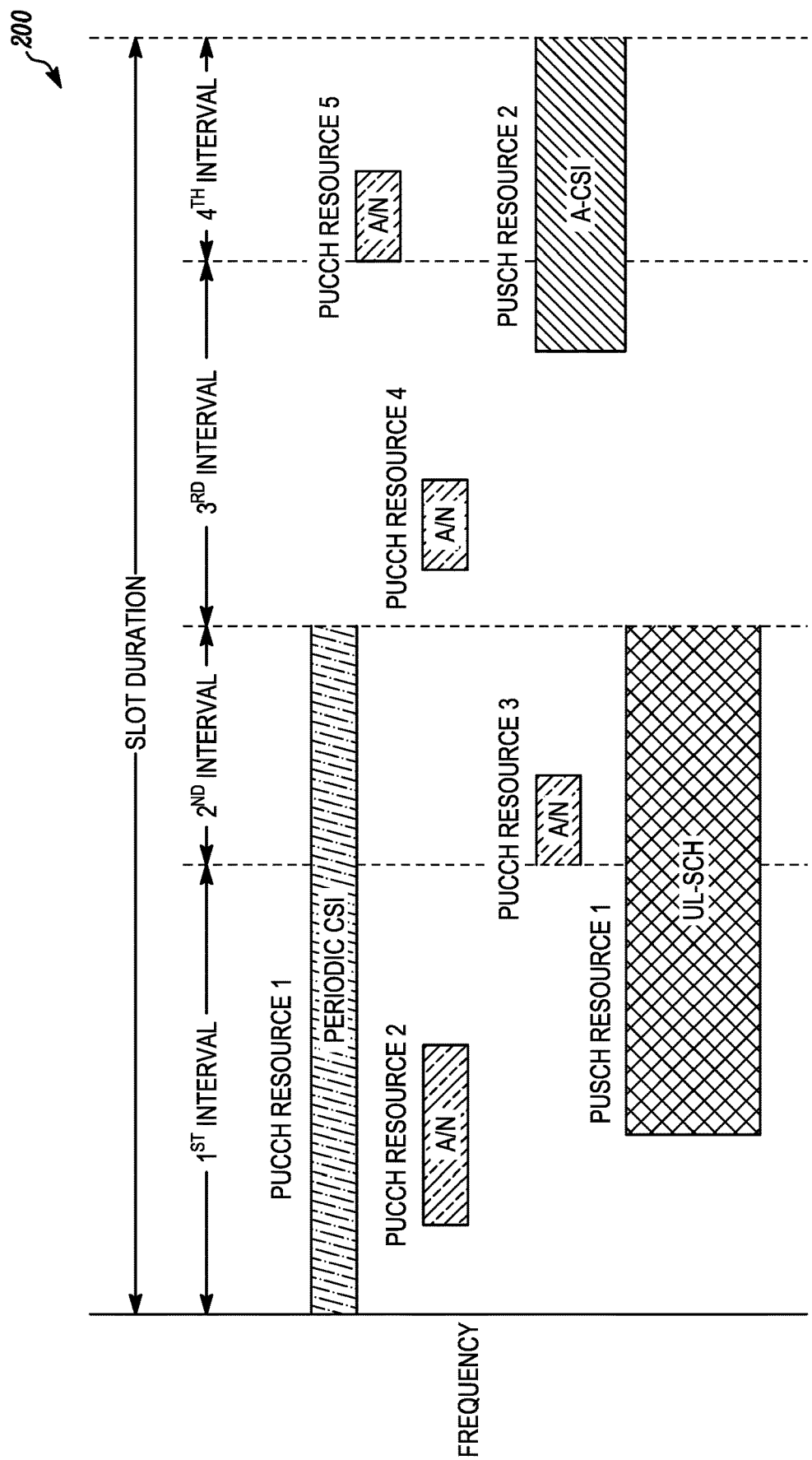
FIG. 2 is an example illustration of PUCCH and PUSCH resources in a slot according to a possible embodiment.

FIG. 2 is an example illustration 200 of PUCCH and PUSCH resources in a slot according to a possible embodiment. In the illustration 200, a UE can perform periodic Channel State Information (CSI), Uplink-Shared Channel (UL-SCH), Aperiodic CSI (A-CSI), and 4 HARQ-ACK transmissions within a slot. Each HARQ-ACK transmission can have an associated forced ending indication. That is, a first, second, third, and fourth HARQ-ACK transmissions can end no later than the end of first, second, third, and fourth time intervals within the slot, respectively. The first, second, third, and fourth time intervals can be considered subslots. In the first timing test, the UE can exclude PUCCH resource 1 for periodic CSI from a group of PUCCH resources, such as PUCCH resources 1-5, to satisfy the forced ending condition for the first HARQ-ACK transmission in PUCCH resource 1. Although PUCCH resources 2 and 3 overlap with PUSCH resource 1, the UE may not multiplex HARQ-ACK in PUSCH resource 1, but can drop transmission on PUSCH resource 1 to satisfy forced ending condition of the first HARQ-ACK transmission. For the fourth HARQ-ACK transmission associated with PUCCH resource 5, the UE can multiplex HARQ-ACK in PUSCH resource 2, as PUSCH resource 2 satisfies the forced ending condition for the fourth HARQ-ACK transmission. For example, the UE may not transmit in PUCCH resource 5, but can instead transmit in PUSCH resource 2.

According to a possible embodiment related to the embodiment shown in illustration 200, if the UL-SCH of PUSCH resource 1 is repeated multiple times, upon dropping of the first PUSCH, based on the configured Redundancy Version (RV) sequence for the PUSCH transmission, the following PUSCH repetition(s) can be also dropped until the PUSCH repetition occasion associated with RV0. The UL-SCH can be a transport channel used by MAC and it can map to a PUSCH. As understood to one of ordinary skill in the art, the UL-SCH of PUSCH resource 1 can be repeated multiple times in consecutive time-domain resources to increase the reliability of PUSCH transmission, such as, as part of a configured grant UL resource allocation.

Also, if the second PUSCH resource is a repetition of the second PUSCH where an earlier transmission of the second PUSCH, for example could be finished in the third interval, if the earlier transmission of the second PUSCH carries ACK/NACK of PUCCH resource 4, then the repetition of the second PUSCH in the second PUSCH resource can be dropped, and ACK/NACK of PUCCH resource 5 should be transmitted in PUCCH resource 5.

For example, at least some of the above embodiments can be implemented with the following text for Subclause 9.2.5 of 3GPP TS 38.213.

START of Example Text for Subclause 9.2.5:

If a UE transmits multiple PUCCHs in a time interval within a slot that include HARQ-ACK information, Scheduling Request (SR), and CSI reports and any PUCCH with HARQ-ACK information in the time interval within the slot satisfies the above timing conditions (i.e. timeline conditions described in 9.2.5 of TS 38.213 that the first symbol $S_0$ of the earliest PUCCH or PUSCH, among a group overlapping PUCCHs and PUSCHs in the time interval within the slot, satisfies) and does not overlap with any other PUCCH or PUSCH in the time interval within the slot that does not satisfy the timing conditions, the UE multiplexes HARQ-ACK information, SR, and CSI reports and determines corresponding PUCCH(s) for transmission in the time interval within the slot according to the following pseudo-code. If the multiple PUCCHs do not include HARQ-ACK information and do not overlap with any PUSCH transmission by the UE in response to a DCI format detection by the UE, the timing conditions do not apply.

If
  a UE is not provided higher layer parameter multi-CSI-PUCCH-ResourceList, and
  a resource for a PUCCH transmission with HARQ-ACK information in response to SPS PDSCH reception and/or a resource for a PUCCH associated with a SR occasion overlap in time with two resources for respective PUCCH transmissions with two periodic/semi-persistent CSI reports, and
  there is no resource for a PUCCH transmission with HARQ-ACK information in response to a DCI format detection that overlaps in time with any of the previous resources, and
  the following pseudo code results to the HARQ-ACK information and/or the SR being multiplexed on two one PUCCH transmissions with periodic/semi-persistent CSI reports the UE
  multiplexes the HARQ-ACK information and/or the SR in the resource for the PUCCH transmission with the periodic/semi-persistent CSI report having the higher priority, and does not transmit the PUCCH with the periodic/semi-persistent CSI report having the lower priority For $1 \leq k \leq K$, where K is a number of time intervals in a slot Set $Q_k$ to the set of resources for transmission of corresponding PUCCHs in the k-th time interval of a slot where each resource of the set of resources partially or fully overlaps with the k-th time interval a resource with earlier first symbol is placed before a resource with later first symbol for two resources with same first symbol, the resource with longer duration is placed before the resource with shorter duration for two resources with same first symbol and same duration, the placement is arbitrary the above three steps for the set $Q_k$ are according to a subsequent pseudo-code for a function order($Q_k$)

if the UE is not provided higher layer parameter simultaneousHARQ-ACK-CSI and resources for transmission of HARQ-ACK information include PUCCH format 0 or PUCCH format 2, resources that include PUCCH format 2, or PUCCH format 3, or PUCCH format 4 for transmission of CSI reports are excluded from the set $Q_k$ if they overlap with any resource from the resources for transmission of HARQ-ACK information if the UE is not provided higher layer parameter simultaneousHARQ-ACK-CSI and at least one of the resources for transmission of HARQ-ACK information includes PUCCH format 1, PUCCH format 3, or PUCCH format 4 resources that include PUCCH format 3 or PUCCH format 4 for transmission of CSI reports are excluded from the set $Q_k$ resources that include PUCCH format 2 for transmission of CSI reports are excluded from the set $Q_k$ if they overlap with any resource from the resources for transmission of HARQ-ACK information if at least one of the resources for transmission of HARQ-ACK information include PUCCH format 0 or PUCCH format 2 and is within the k-th time interval of the slot, resources that do not end by the end of the k-th time interval of the slot are excluded from the set $Q_k$. (In another example, if at least one of the resources for transmission of HARQ-ACK information is within the k-th time interval of the slot, resources that do not end by the end of the k-th time interval of the slot are excluded from the set $Q_k$)

```
Set 𝒞 (Q_k) to the cardinality of Q_k
Set Q_k(j,0) to be the first symbol of resource Q_k(j) for the k-th time interval of the slot
Set L(Q_k(j)) to be the number of symbols of resource Q_k(j) in the k-th time interval of
the slot
    Set j = 0 , the index of first resource in set Q_k
    Set o = 0 , the counter of overlapped resources
while j ≤ 𝒞 (Q_k)- 1
    if j < 𝒞 (Q_k)- 1 and resource Q_k(j - o) overlaps with resource Q_k(j + 1)
        o = o + 1
        j = j + 1
    else
        if o > 0
            multiplex UCI for resources {Q_k(j - o),Q_k(j - o + 1),...,Q_k(j)} in a single resource as
                described in Subclauses 9.2.5.1 and 9.2.5.2
            set the index of the single resource to j
            Q_k = Q_k \ {Q_k (j - o),Q_k(j - o + 1),...,Q_k(j - 1)}
            j = 0 % start from the beginning after reordering unmerged resources at next step
            o = 0
            order(Q_k) % function that re-orders resources in current set Q_k
        else
            j = j + 1
        end if
    end if
end while
end for
```

The function order($Q_k$) performs the following pseudo-code

```
{
  n = 0
  while n < 𝒞 (Q_k)- 1 % the next two while loops are to re-order the unmerged resources
    l = 0
    while l < 𝒞 (Q_k)- 1- n
      if Q_k(l,0) > Q_k(l + 1,0) OR (Q_k(l,0) = Q_k(l + 1,0) & L(Q_k(l)) < L(Q_k (l + 1)))
        temp = Q_k(l)
        Q_k(l) = Q_k(l + 1)
        Q_k(l + 1) = temp
      end if
      l = l + 1
    end while
    n = n + 1
  end while
}
```

For each PUCCH resource in the set $Q_k$ that satisfies the aforementioned timing conditions, when applicable, the UE transmits a PUCCH using the PUCCH resource if the PUCCH resource does not overlap in time with a PUSCH transmission the UE multiplexes HARQ-ACK information and/or CSI reports in a PUSCH if the PUCCH resource overlaps in time with a PUSCH transmission, as described in Subclause 9.3, the PUSCH transmission ends no later than the end of the k-th time interval of the slot, and does not transmit SR. In case the PUCCH resource carrying HARQ-ACK information overlaps in time with multiple PUSCH transmissions that end no later than the end of the k-th time interval of the slot, the PUSCH for multiplexing HARQ-ACK information and/or CSI is selected as described in Subclause 9. If the PUSCH transmission by the UE is not in response to a DCI format detection and the UE multiplexes only CSI reports, the timing conditions are not applicable.

END of example text for Subclause 9.2.5.

According to another possible embodiment, if multiple PDCCHs carrying DL DCI indicate a same slot for HARQ-ACK transmission(s) and timing conditions described above for multiplexing multiple HARQ-ACK information are met, a UE can determine whether to actually multiplex one or more HARQ-ACK information and replace a previously assigned PUCCH resource with a PUCCH resource assigned by a later received PDCCH, based on the indication of forced ending of HARQ-ACK transmission. For example, if the UE determines, based on the forced ending indication, that HARQ-ACK transmission associated with a first assigned PUCCH resource for a first HARQ-ACK indicated by a first PDCCH shall end no later than a first time instance in a slot and receives an indication of a second assigned PUCCH resource for a first and second HARQ-ACK or only for the second HARQ-ACK via a second PDCCH, where the second assigned PUCCH resource is also included in the slot and the second PDCCH is received later than the first PDCCH with satisfying the multiplexing timing conditions described in the first paragraph of Section 2, the UE can perform the following:

First, the UE can determine the second assigned PUCCH resource by assuming that the second assigned PUCCH resource is for the first and second HARQ-ACK and by identifying a valid PUCCH resource set based on the payload size of the first and second HARQ-ACK.

If the determined second assigned PUCCH resource ends later than the first time instance, the UE can re-determine the second assigned PUCCH resource by assuming that the second assigned PUCCH resource is only for the second HARQ-ACK, and can transmit the first HARQ-ACK in the first assigned PUCCH resource and transmit the second HARQ-ACK in the second assigned PUCCH resource if the first assigned PUCCH resource does not overlap with the second assigned PUCCH resource in time. Otherwise, the UE can multiplex the first and second HARQ-ACK in the determined second assigned PUCCH resource.

If the first and second HARQ-ACK are multiplexed in the second assigned PUCCH resource or if the second assigned PUCCH resource has an associated forced ending indication, the UE can determine a second time instance for forced ending based on the second assigned PUCCH resource.

If the UE receives an indication of a third assigned PUCCH resource for a third HARQ-ACK via a third PDCCH, where the third assigned PUCCH resource is in the slot and the third PDCCH is received later than the second PDCCH with satisfying the multiplexing timing conditions described above, then first, the UE can determine the third assigned PUCCH resource by assuming that the third assigned PUCCH resource is for the first, second, and third HARQ-ACK if the first and second HARQ-ACK were multiplexed or for the second and third HARQ-ACK if the first and second HARQ-ACK were not multiplexed and by identifying a valid PUCCH resource set based on the payload size of the first, second, and third HARQ-ACK or based on the payload size of the second and third HARQ-ACK.

If the determined third assigned PUCCH resource ends later than the second time instance, the UE can re-determine the third assigned PUCCH resource by assuming that the third assigned PUCCH resource is only for the third HARQ-ACK, and the UE can transmit the first and second HARQ-ACK or the second HARQ-ACK in the second assigned PUCCH resource and transmit the third HARQ-ACK in the third assigned PUCCH resource. Otherwise, the UE can multiplex the first, second, and third HARQ-ACK or the second and third HARQ-ACK in the determined third assigned PUCCH resource.

Figure 3:
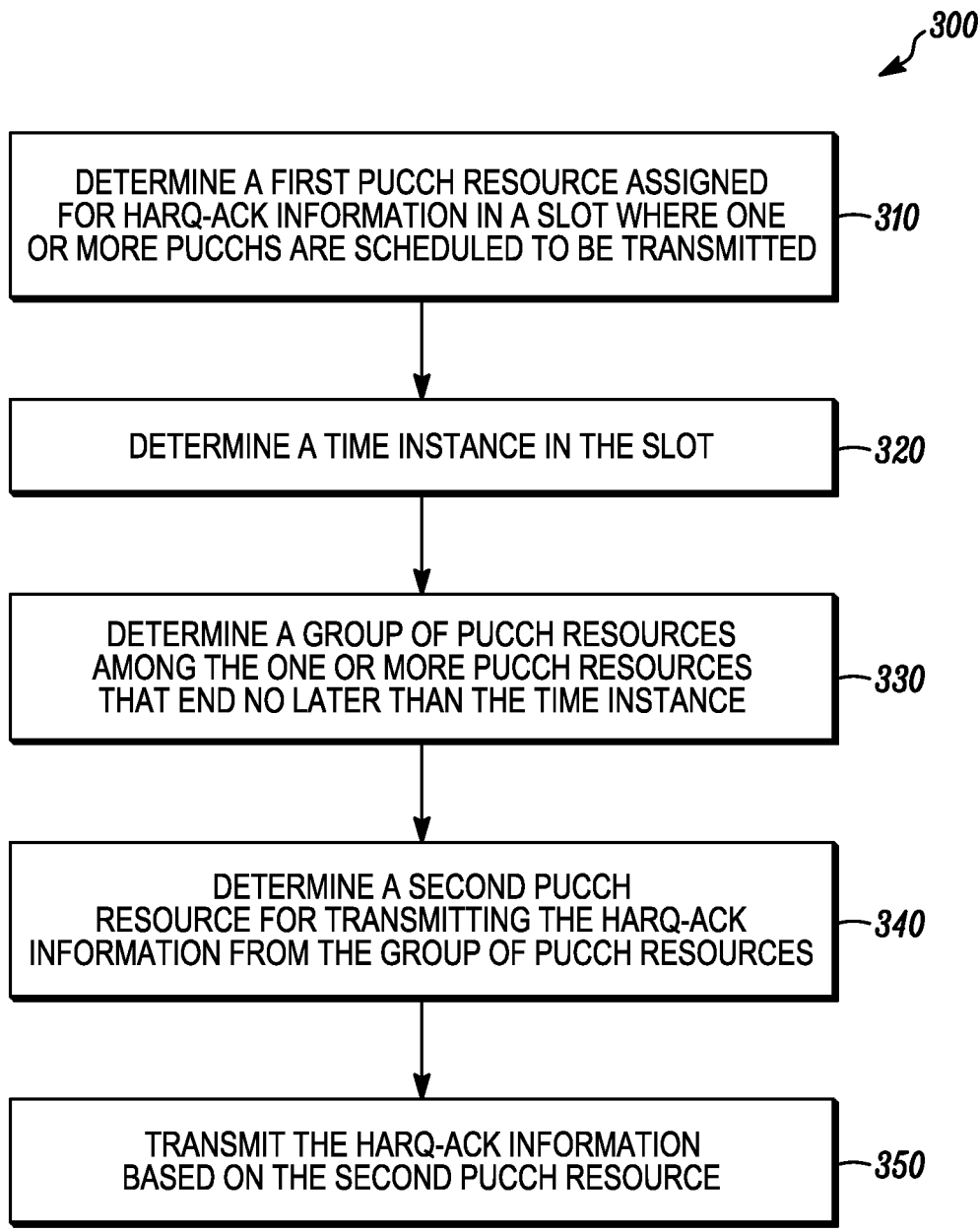
FIG. 3 is an example flowchart illustrating the operation of an apparatus according to a possible embodiment.

FIG. 3 is an example flowchart 300 illustrating the operation of a wireless communication device, such as the UE 110, according to a possible embodiment. At 310, a first PUCCH resource can be determined. The first PUCCH resource can be assigned for HARQ-ACK information in a slot where one or more PUCCHs are scheduled to be transmitted. The first PUCCH resource can be assigned for the HARQ-ACK information transmission. The first PUCCH resource can be dynamically or semi-statically indicated to the UE. The HARQ-ACK information can be acknowledgement or negative acknowledgement of successful decoding of a Transport Block (TB). The HARQ-ACK information can be at least one bit.

At 320, a time instance in the slot can be determined. According to a possible embodiment, the time instance can be determined based on the first PUCCH resource. The time instance can end no later than a last symbol of the first PUCCH resource. For example, the time instance can be the end of the last symbol of the first PUCCH resource.

According to a possible embodiment, configuration information of one or more subslots within the slot can be received. Each of the one or more subslots can be a time interval within the slot. The time instance can be determined as an end of a subslot of the one or more subslots. A last symbol of the first PUCCH resource can be within the subslot. According to a possible implementation, an indication can be received that indicates transmission of the HARQ-ACK information ends within the subslot. The indication can be received in DCI indicating assignment of the first PUCCH resource for the HARQ-ACK information. The indication can also be received via higher layer signaling that configures the first PUCCH resource for the HARQ-ACK information. For example, the indication can be received as part of configuration information of the first PUCCH resource. The indication can be explicit or implicit. For example, the indication can be an indication of URLLC operation mode that implicitly indicates transmission of the HARQ-ACK information ends within the subslot. For example, URLLC operation mode can use subslot-based HARQ-ACK feedback. The time instance can be determined based on the indication.

At 330, a group of PUCCH resources can be determined among the one or more PUCCH resources that end no later than the time instance. At 340, a second PUCCH resource for transmitting the HARQ-ACK information can be determined from the group of PUCCH resources. The second PUCCH resource can be the same or different from the first PUCCH resource. At 350, the HARQ-ACK information based on the second PUCCH resource can be transmitted.

According to a possible embodiment, a PUSCH resource that overlaps with the second PUCCH resource in time can be identified. The HARQ-ACK information can be multiplexed into the PUSCH resource if the PUSCH resource ends no later than the time instance. The HARQ-ACK information can be transmitted on the PUSCH resource. Alternately, the UL resource can be determined to be the second PUCCH resource if the HARQ-ACL information is not multiplexed into the PUSCH resource.

According to another possible embodiment, the HARQ-ACK information can be first HARQ-ACK information and second HARQ-ACK information. A first PDCCH can be received. The first PDCCH can indicate a third PUCCH resource assigned for the first HARQ-ACK information. The third PUCCH resource can end no later than the time instance in the slot. A second PDCCH can be received. The second PDCCH can indicate the first PUCCH resource assigned for the first HARQ-ACK information and the second HARQ-ACK information. The second PDCCH can be received later than the first PDCCH. The latest indication of the first PUCCH resource can be used for transmission of the first HARQ-ACK information. The third PUCCH resource may not be included in the one or more PUCCH resources scheduled to be transmitted. For example, the third PUCCH resource may not be part of the one or more PUCCH resources scheduled to be transmitted. The third PUCCH resource can be overridden by the first PUCCH resource indicated by the later second PDCCH.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 4:
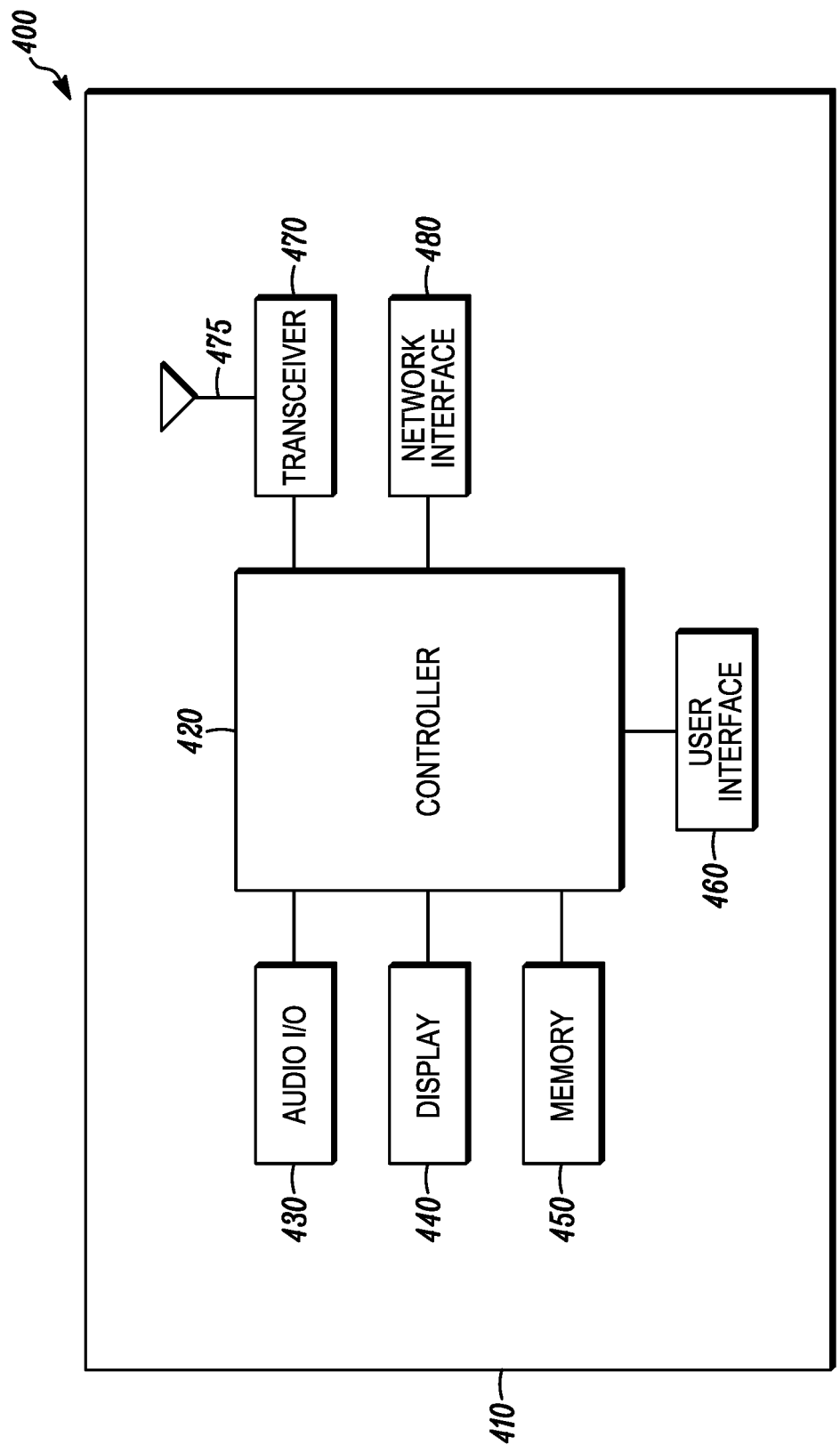
FIG. 4 is an example block diagram of an apparatus according to a possible embodiment.

FIG. 4 is an example block diagram of an apparatus 400, such as the UE 110, the network entity 120, or any other wireless communication device disclosed herein, according to a possible embodiment. The apparatus 400 can include a housing 410, a controller 420 coupled to the housing 410, audio input and output circuitry 430 coupled to the controller 420, a display 440 coupled to the controller 420, a memory 450 coupled to the controller 420, a user interface 460 coupled to the controller 420, a transceiver 470 coupled to the controller 420, at least one antenna 475 coupled to the transceiver 470, and a network interface 480 coupled to the controller 420. The apparatus 400 may not necessarily include all of the illustrated elements for different embodiments of the present disclosure. The apparatus 400 can perform the methods described in all the embodiments.

The display 440 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 470 can be one or more transceivers that can include a transmitter and/or a receiver. The audio input and output circuitry 430 can include a microphone, a speaker, a transducer, or any other audio input and output circuitry. The user interface 460 can include a keypad, a keyboard, buttons, a touch pad, a joystick, a touch screen display, another additional display, or any other device useful for providing an interface between a user and an electronic device. The network interface 480 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 450 can include a Random-Access Memory (RAM), a Read Only Memory (RON), an optical memory, a solid-state memory, a flash memory, a removable memory, a hard drive, a cache, or any other memory that can be coupled to an apparatus.

The apparatus 400 or the controller 420 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 450, elsewhere on the apparatus 400, in cloud storage, and/or anywhere else that can store software and/or an operating system. The apparatus 400 or the controller 420 may also use hardware to implement disclosed operations. For example, the controller 420 may be any programmable processor. Furthermore, the controller 420 may perform some or all of the disclosed operations. For example, some operations can be performed using cloud computing and the controller 420 may perform other operations. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 420 may be any controller or processor device or devices capable of operating an apparatus and implementing the disclosed embodiments. Some or all of the additional elements of the apparatus 400 can also perform some or all of the operations of the disclosed embodiments.

In operation, the apparatus 400 can perform the methods and operations of the disclosed embodiments. The transceiver 470 can transmit and receive signals, including data signals and control signals that can include respective data and control information. The controller 420 can generate and process the transmitted and received signals and information.

According to a possible embodiment, the controller 420 can determine a first PUCCH resource assigned for HARQ-ACK information in a slot where one or more PUCCHs are scheduled to be transmitted. The controller 420 can determine a time instance in the slot. According to a possible embodiment, the controller 420 can determine the time instance based on the first PUCCH resource. The time instance can end no later than a last symbol of the first PUCCH resource. According to another possible embodiment, the transceiver 470 can receive configuration information of one or more subslots within the slot. Each of the one or more subslots comprises a time interval within the slot. The controller 420 can determine the time instance as an end of a subslot of the one or more subslots. A last symbol of the first PUCCH resource can be within the subslot.

According to another possible embodiment, the transceiver 470 can receive an indication that indicates transmission of the HARQ-ACK information ends within the subslot. The controller 420 can determine the time instance based on the indication. The indication can be received in DCI indicating assignment of the first PUCCH resource for the HARQ-ACK information. The indication can also be received via higher layer signaling that configures the first PUCCH resource for the HARQ-ACK information. The indication can be an indication of URLLC operation mode that implicitly indicates transmission of the HARQ-ACK information ends within the subslot.

The controller 420 can determine a group of PUCCH resources among the one or more PUCCH resources that end no later than the time instance. The controller 420 can determine a second PUCCH resource for transmitting the HARQ-ACK information from the group of PUCCH resources. The transceiver 470 can transmit the HARQ-ACK information based on the second PUCCH resource.

According to a possible embodiment, the controller 420 can identify a PUSCH resource that overlaps with the second PUCCH resource in time. The controller 420 can multiplex the HARQ-ACK information into the PUSCH resource if the PUSCH resource ends no later than the time instance. The transceiver 470 can transmit the HARQ-ACK information on the PUSCH resource.

According to another possible embodiment, the HARQ-ACK information can include first HARQ-ACK information and second HARQ-ACK information. The transceiver 470 can receive a first PDCCH indicating a third PUCCH resource assigned for the first HARQ-ACK information. The third PUCCH resource can end no later than the time instance in the slot. The transceiver 470 can receive a second PDCCH indicating the first PUCCH resource assigned for the first HARQ-ACK information and the second HARQ-ACK information. The second PDCCH can be received later than the first PDCCH. The controller 420 can use the latest indication of the first PUCCH resource for transmission of the first HARQ-ACK information. The third PUCCH resource may not be included in the one or more PUCCH resources scheduled to be transmitted.

At least some embodiments can provide for a UE receiving a configuration for one or more time intervals within a slot for multiple HARQ-ACK transmissions in the slot and an indication of whether an uplink channel carrying HARQ-ACK information should end within a time interval of a slot where the last symbol of a PUCCH resource assigned for the HARQ-ACK information is located. The indication for forced ending of HARQ-ACK transmission can guarantee bounded HARQ-ACK feedback delay even when the UE does not use the initially assigned PUCCH resource for HARQ-ACK transmission but multiplexes multiple UCI including the HARQ-ACK information and transmits them in one PUCCH or PUSCH resource.

At least some embodiments can allow multiple HARQ-ACK feedback opportunities from a UE in a slot without changing Rel-15 PUCCH resource configuration framework and slot-level HARQ-ACK feedback delay indication. Compared to symbol-level HARQ-ACK feedback delay indication, embodiments can require less feedback delay indication bits in DL DCI formats. Furthermore, embodiments can still allow a network entity to re-assign a different PUCCH resource for HARQ-ACK transmission based on later transmitted DCI, if necessary.

At least some embodiments can provide a method at a UE. The method can include determining a first PUCCH resource assigned for first HARQ-ACK information in a slot, where one or more PUCCHs can be transmitted. The method can include determining a first group of PUCCH resources based on the one or more PUCCHs that can be transmitted in the slot. The method can include receiving an indication of forced ending for a first HARQ-ACK transmission associated with the first HARQ-ACK information in the slot. The method can include determining a first time instance no later than when the first HARQ-ACK transmission ends. The method can include determining a second group of PUCCH resources by excluding a PUCCH resource(s) from the first group of PUCCH resources that overlaps with the first PUCCH resource and ends later than the first time instance. The method can include determining an uplink channel carrying the first HARQ-ACK information based on the second group of PUCCH resources.

The indication of forced ending for the first HARQ-ACK transmission can be received in DCI indicating assignment of the first PUCCH resource for the first HARQ-ACK information. The indication of forced ending for the first HARQ-ACK transmission can be received as part of configuration information of the first PUCCH resource. Forced ending for the first HARQ-ACK transmission can be implicitly indicated by receiving an indication of URLLC operation mode. The first time instance can be determined based on the first PUCCH resource assigned for the first HARQ-ACK information. The first time instance can be based on a last symbol of the first PUCCH resource. The method can include receiving configuration information for one or more time intervals within the slot for one or more HARQ-ACK transmissions in the slot, and determining the first time instance as an end of a time interval of the one or more time intervals, wherein a last symbol of the first PUCCH resource is within the time interval.

The method can include determining a second PUCCH resource for the first HARQ-ACK transmission from the second group of PUCCH resources. The method can include identifying a PUSCH resource that overlaps with the second PUCCH resource in time. The method can include multiplexing the first HARQ-ACK information into the PUSCH resource if the PUSCH resource ends no later than the first time instance.

The method can include receiving a first PDCCH indicating the first PUCCH resource assigned for the first HARQ-ACK information. The method can include receiving a second PDCCH indicating a second PUCCH resource assigned for the first HARQ-ACK information and second HARQ-ACK information. The second PUCCH resource can be in the slot and can end no later than the first time instance.

The method can include receiving a first PDCCH indicating the first PUCCH resource assigned for the first HARQ-ACK information. The method can include receiving a second PDCCH indicating a second PUCCH resource assigned for second HARQ-ACK information. The second PUCCH resource can be in the slot and can end later than the first time instance and the first PUCCH resource may not overlap with the second PUCCH resource in time.

At least some embodiments can provide method at a UE. The method can include determining a first PUCCH resource assigned for first HARQ-ACK information in a slot where one or more PUCCHs can be transmitted. The method can include determining a group of PUCCH resources based on the one or more PUCCHs that would be transmitted in the slot such that no PUCCH resource in the group of PUCCH resources ends later than the end of the first PUCCH resource assigned for the first HARQ-ACK transmission. The method can include determining an uplink channel carrying the first HARQ-ACK information based on the determined group of PUCCH resources. The method can also include receiving an indication to restrict the determined uplink channel comprising the first HARQ-ACK information to end no later than the end of the first PUCCH resource assigned for the first HARQ-ACK transmission.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of" or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A user equipment (UE) comprising:
at least one memory; and
at least one processor coupled with the at least one memory and configured to cause the UE to:
receive a configuration of a plurality of subslots of a slot;
determine a first physical uplink control channel (PUCCH) resource that is within the slot and is allocated for a first PUCCH transmission associated with Hybrid Automatic Repeat Request-Acknowledgement (HARQ-ACK) information during the slot,
the first PUCCH resource overlapping with at least one second PUCCH resource within the slot for a second PUCCH transmission during the slot,
wherein the first PUCCH transmission associated with the HARQ-ACK information ends during a subslot of the plurality of subslots, the subslot of the plurality of subslots assigned for a respective instance of HARQ-ACK feedback, and
wherein a last symbol of the first PUCCH resource is within the subslot;
select a third PUCCH resource within the subslot based on the first PUCCH transmission associated with the HARQ-ACK information ending during the subslot of the plurality of subslots and a last symbol of the third PUCCH resource being within the subslot; and
multiplex the HARQ-ACK information with the second PUCCH transmission on the third PUCCH resource.

2. The UE according to claim 1, wherein the at least one processor is further configured to cause the UE to transmit at most one instance of HARQ-ACK feedback per subslot of the plurality of subslots.

3. The UE according to claim 1, wherein the at least one processor is further configured to cause the UE to transmit the multiplexed HARQ-ACK information on the third PUCCH resource.

4. The UE according to claim 1, wherein the at least one processor is further configured to cause the UE to:
multiplex the HARQ-ACK information on a physical uplink shared channel (PUSCH) resource when the second PUCCH resource overlaps the PUSCH resource and the PUSCH resource ends within the subslot; and
transmit the HARQ-ACK information on the PUSCH resource.

5. The UE according to claim 4, wherein the at least one processor is further configured to cause the UE to multiplex the HARQ-ACK information with the second PUCCH transmission on the third PUCCH resource when the first PUCCH resource does not overlap with the PUSCH resource.

6. The UE according to claim 1, wherein the at least one processor is further configured to cause the UE to receive downlink control information that indicates an assignment of the first PUCCH resource for the HARQ-ACK information.

7. The UE according to claim 1, wherein the at least one processor is further configured to cause the UE to receive higher layer signaling that configures the first PUCCH resource for the HARQ-ACK information.

8. A method at a user equipment (UE), the method comprising:
receiving a configuration of a plurality of subslots of a slot;
determining a first physical uplink control channel (PUCCH) resource that is within the slot and is allocated for a first PUCCH transmission associated with Hybrid Automatic Repeat Request-Acknowledgement (HARQ-ACK) information during the slot,
the first PUCCH resource overlapping with at least one second PUCCH resource within the slot for a second PUCCH transmission during the slot, wherein the first PUCCH transmission associated with the HARQ-ACK information ends during a subslot of the plurality of subslots, the subslot of the plurality of subslots assigned for a respective instance of HARQ-ACK feedback, and wherein a last symbol of the first PUCCH resource is within the subslot;

select a third PUCCH resource within the subslot based on the first PUCCH transmission associated with the HARQ-ACK information ending during the subslot of the plurality of subslots and a last symbol of the third PUCCH resource being within the subslot; and multiplexing the HARQ-ACK information with the second PUCCH transmission on the third PUCCH resource.

9. The method according to claim 8, further comprising transmitting at most one instance of HARQ-ACK feedback per subslot of the plurality of subslots.

10. The method according to claim 8, further comprising transmitting the multiplexed HARQ-ACK information on the third PUCCH resource.

11. The method according to claim 8, further comprising:

multiplexing the HARQ-ACK information on a physical uplink shared channel (PUSCH) resource when the second PUCCH resource overlaps the PUSCH resource and the PUSCH resource ends within the subslot; and transmitting the HARQ-ACK information on the PUSCH resource.

12. The method according to claim 11, wherein multiplexing the HARQ-ACK information comprises multiplexing HARQ-ACK information with the second PUCCH transmission on the third PUCCH resource when the first PUCCH resource does not overlap with the PUSCH resource.

13. The method according to claim 8, further comprising receiving downlink control information that indicates an assignment of the first PUCCH resource for the HARQ-ACK information.

14. The method according to claim 8, further comprising receiving higher layer signaling that configures the first PUCCH resource for the HARQ-ACK information.

15. A base station for wireless communication, the base station comprising:

at least one memory; and at least one processor coupled with the at least one memory and configured to cause the base station to:

transmit a configuration of a plurality of subslots of a slot;

determine a first physical uplink control channel (PUCCH) resource that is within the slot and is allocated for Hybrid Automatic Repeat Request-Acknowledgement (HARQ-ACK) information during the slot, the first PUCCH resource overlapping with at least one second PUCCH resource within the slot for a second PUCCH transmission during the slot, wherein the first PUCCH transmission associated with the HARQ-ACK information ends during a subslot of the plurality of subslots, the subslot of the plurality of subslots assigned for a respective instance of HARQ-ACK feedback, and wherein a last symbol of the first PUCCH resource is within the subslot;

receive HARQ-ACK information multiplexed with the second PUCCH transmission on a third PUCCH resource, wherein the HARQ-ACK information is multiplexed on the third PUCCH resource, where the third PUCCH resource is based on the first PUCCH transmission ending during the subslot of the plurality of subslots and a last symbol of the third PUCCH resource being within the subslot.

16. The base station according to claim 15, wherein the at least one processor is further configured to cause the base station to receive at most one instance of HARQ-ACK feedback per subslot of the plurality of subslots.

17. The base station according to claim 15, wherein the at least one processor is further configured to cause the base station to receive the HARQ-ACK information multiplexed on a physical uplink shared channel (PUSCH) resource when the second PUCCH resource overlaps the PUSCH resource and the PUSCH resource ends within the subslot.

18. The base station according to claim 17, wherein the at least one processor is further configured to cause the base station to receive the HARQ-ACK information multiplexed on the third PUCCH resource when the PUCCH resource does not overlap with the PUSCH resource.

19. The base station according to claim 15, wherein the at least one processor is further configured to cause the base station to transmit downlink control information that indicates an assignment of the first PUCCH resource for the HARQ-ACK information.

20. The base station according to claim 15, wherein the at least one processor is further configured to cause the base station to transmit higher layer signaling that configures the first PUCCH resource for the HARQ-ACK information.

* * * * *